United States Patent Office 3,393,534
Patented July 23, 1968

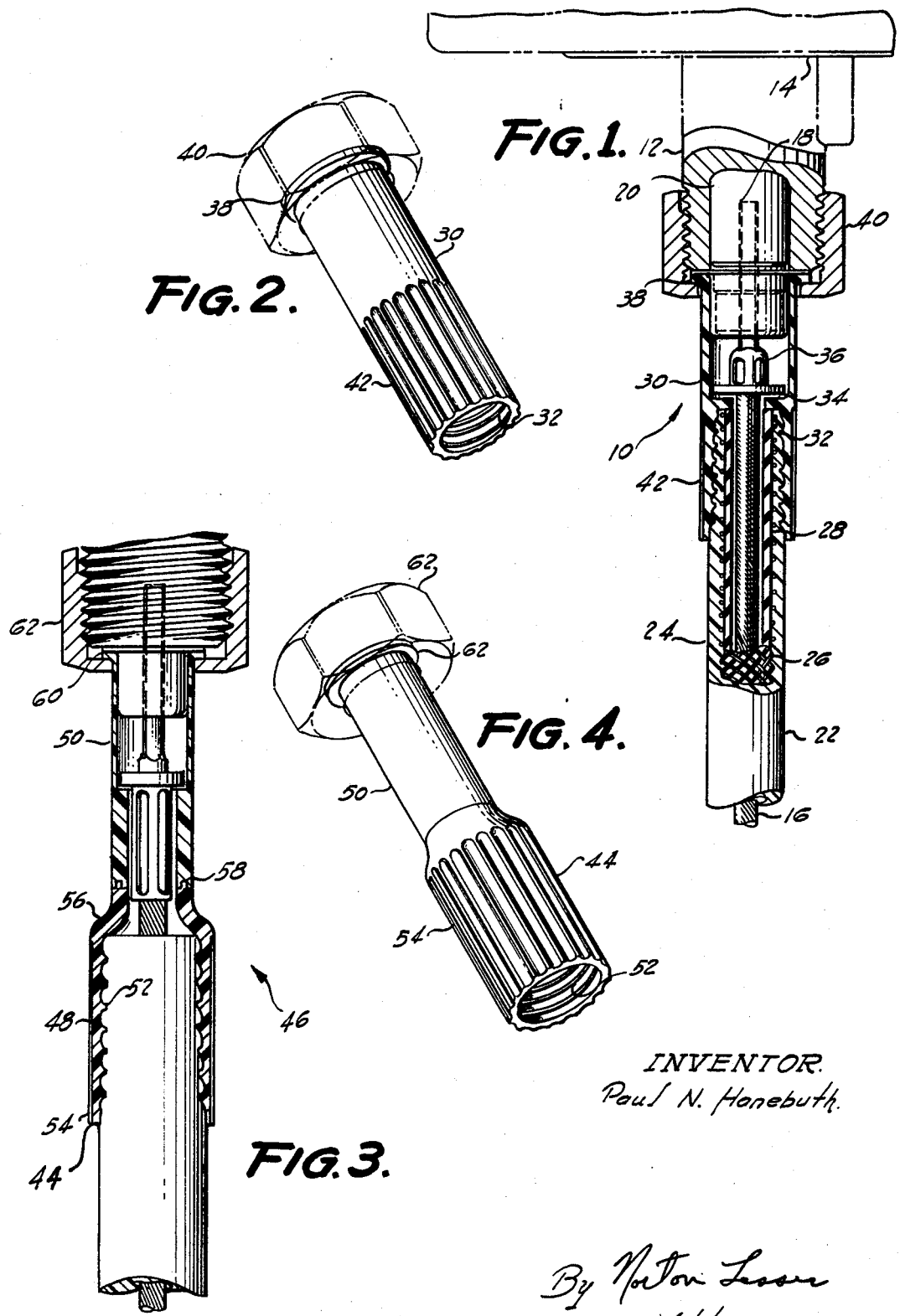

3,393,534
FERRULE FOR A FLEXIBLE SHAFT CASING
Paul N. Hanebuth, Elmhurst, Ill., assignor to Stewart-Warner Corporation, Chicago, Ill., a corporation of Virginia
Filed May 23, 1966, Ser. No. 552,260
5 Claims. (Cl. 64—4)

ABSTRACT OF THE DISCLOSURE

The following specification describes a plastic ferrule for self-threading engagement with a flexible shaft casing of the type having an inner plastic liner surrounded by a metallic wrap and an outer plastic covering.

---

This invention relates in general to ferrules for flexible shaft casings and more particularly to a ferrule which may be fixed to the flexible shaft casing without special tools to permit the shaft and casing to be cut to a desired length and field installed.

One of the problems which the present invention is designed to solve arises out of need for dealers and others handling flexible shaft equipment to stock a large number of flexible shaft sizes. This is required because of the different shaft lengths needed between the transmission or other drives and the speedometer, or other instrument of various types of vehicles or engines.

The flexible shafts are also provided with a casing of a corresponding length that encircles and protects each shaft. The casings carry a ferrule at each end that permit the casing to be fastened to the speedometer and transmission housing respectively so that the shaft is properly supported without itself being fixed in position.

The ferrules are generally metal tubes each having a shoulder or flange at one end where they are secured to the instrument or housing. The other end of each ferrule has a crimp to provide a sealed connection to the casing, which is often a smooth surfaced plastic material. Proper crimping without damaging the ferrule or casing is difficult to provide without factory equipment. This prevents dealers from stocking a standard length shaft and casing and cutting the same to length, as needed, and then adding a ferrule to one end.

The basic object of the invention is therefore to provide an improved ferrule which may be simply and securely assembled without special equipment to a smooth surfaced plastic flexible shaft casing to form a sealed secure connection to the casing.

The improved ferrule is achieved by moulding a plastic tube with internal tapered threads thereon. The ferrule is threaded on to the casing end after the casing and shaft are cut to a desired length. The threads form corresponding deformations in the outer surface only of the casing and provide a tight sealed connection thereto.

Other objects and features of the present invention will become apparent on examination of the following specification, claims and drawings, wherein:

FIG. 1 shows a portion of a typical flexible shaft assembly for automobiles utilizing a ferrule incorporating the principles of the present invention for fastening the assembly to an instrument;

FIG. 2 is a perspective view of the ferrule shown in FIG. 1 together with a coupling nut shown in broken lines;

FIG. 3 shows a portion of a typical flexible shaft assembly for trucks utilizing a ferrule incorporating the principles of the present invention; and FIG. 4 is a perspective view of the ferrule shown in FIG. 3 together with a coupling nut shown in broken lines.

Referring now to FIG. 1 of the drawings, a flexible shaft assembly, indicated at 10, is shown fastened to an externally threaded boss 12 of a vehicle speedometer indicated at 14. It will be appreciated of course that many other types of instruments such as tachometers or hourmeters may be used in place of speedometer 14.

The shaft assembly 10 comprises an elongate flexible shaft 16 having a tip 18 of irregular cross-section for engagement in a correspondingly shaped recess of a driven element 20 in the speedometer. The other end of the shaft 16 is rotated by a driving element at, for example, a vehicle transmission, wheel or other apparatus.

A flexible casing 22 of a type such as disclosed in Robinson and Schmid Patent No. 3,242,691, encircles the shaft 16. The casing 22 may comprise a plastic outer wall 24 having a smooth outer surface, an intermediate section 26 of braided wire and an inner plastic wall 28 whose inner surface is normally spaced from the shaft 16.

A ferrule 30 is supplied at the casing end to permit the casing to be fastened to the threaded boss of the instrument 12. The ferrule 30 comprises a tube of moulded Delrin or other plastic such as nylon that is somewhat harder than the plastic of outer wall 24.

The axial length of the ferrule is approximately 1.25" and it has internal 16 pitch truncated threads 32 initiated adjacent one end of the ferrule and extending for substantially ½". The threads 32 are tapered from a minor diameter of .342"–.347" adjacent the one end of the ferrule to a minor diameter of .315"–.320" adjacent their end near the center of the ferrule with the major diameter being .35" to .355". An internal annular stop wall 34 is formed adjacent the ends of the threads and approximately half-way between the ends of the ferrule 30 to abut the corresponding end of casing 22 with an opening in wall 34 of approximately .163"–.168".

The opening in wall 34 serves to pass the flexible shaft 16 and the remainder of the ferrule has an internal diameter of .384" to .390" to accommodate a stop 36. Stop 36 is crimped to the shaft 16 and has the tip 18 formed as a projection thereon, although other arrangements for providing the tip are also used. The stop 36 may abut the surface of wall 34 opposite the casing 22 to prevent the shaft and tip disengaging from the driven element 20 under the influence of gravity or other forces.

The outer diameter of the ferrule is approximately .445"–.45" and terminates at the end to be secured to boss 12 in a peripheral flange 38 enabling the ferrule to be fastened to the boss 12 with a coupling nut 40. The outer surface of the ferrule 34 also has flutes 42 to a depth of .01"–.015" from the one end to its mid-portion.

The shaft 16 and casing 20 are provided separately in standard lengths with a factory equipped ferrule at one end of casing 20 for engagement with suitable support apparatus adjacent the driving element in a conventional manner. When the need for a particular length arises, the casing is cut to the corresponding length at the end opposite the factory equipped ferrule. A rod serving as a mandrel or arbor is inserted into the casing. The casing 22, having an outer diameter of .335"–.340", is inserted into the threaded end of the ferrule 30 through the nut 40.

Since the diameter of the first few threads 32 at the end of the ferrule are slightly larger than the casing, a support length is provided for axially aligning the casing with the ferrule. The ferrule is then threaded onto the casing to deform the outer surface only of the wall 24 into the space between the threads without deforming the inner casing wall 28, until the casing abuts stop wall 34. The rod is then removed. The shaft 16 is also cut to the required length somewhat longer than the casing and the end is squared to form the tip 18. The shaft is simply inserted in the casing and the stop 36 is crimped onto shaft 16 and received in the ferrule recess. The shaft and casing are thus prepared for use in accordance with the required length.

As shown in FIG. 3, a ferrule 44 of a somewhat different type is used on flexible shaft assemblies such as 46 intended to be mounted on a truck. The assembly 46 has a somewhat larger diameter casing of .435″–.440″. The ferrule 44 comprises a pair of tandem separately moulded tube sections 48 and 50. The sections 48 and 50 are of poly-acetal resin, for example, so as to be somewhat harder than the casing surface. The tube secion 48 is approximately 1″ long and has internally formed square 13 pitch truncated threads 52. The threads 52 have a surface diameter of .45″–.445″ adjacent the one end of the section 48 and this diameter tapers radially inwardly to a surface diameter of .42″–.425″ adjacent the other end of the section. The major diameter of the threads 52 approximates .48″–.49″ and, like the thread recesses formed in ferrule 30, are substantially of constant depth to facilitate even deformation of the casing. The outer diameter of section 48 is approximately .620″–.625″ and longitudinal flutes 54 are also provide therein to a depth of .01″–.015″ to facilitate grasping.

The section 48 is formed radially inwardly adjacent the end of threads 52 to an outer diameter of .445″–.450″ and an inner diameter of .285″–.290″ to form a neck 56 having a circumferential projection 58 thereon intermediate the inner and outer neck surfaces. The circumferential projection 58 engages in a correspondingly shaped recess of section 50, and the section 50 is welded ultrasonically or dielectrically, for example, to section 48 at their juncture. A peripheral shoulder 60 on section 50 at the end opposite section 48 permits the ferrule 44 to be secured to the appropriate instrument by means of a coupling nut 62.

The section 50 is approximately .91″ long and has inner and outer diameters corresponding to neck 56 for approximately .4″ and an inner diameter of .384″–.390″ for the remainder of its length. The larger inner diameter of section 50 accommodates a standard type stop having a tip formed thereon at one end and a tubular portion at the other end for crimping over the flexible shaft. The crimped tubular portion projects back into the smaller diameter passage in section 50.

The two sections 48 and 50 for ferrule 44 are used to permit assembly of the standard coupling nut 62 thereto, since the truck casing is of such diameter that the outer diameter of section 48 must exceed the diameter of the opening in the nut 62.

Assembly of the ferule 44 to the casing proceeds in a manner already described for ferrule 30 and both ferrules will resist a separating force of up to 80 pounds.

The inventive concepts embodied in the foregoing description are believed set forth in the accompanying claims.

What is claimed is:

1. For use with a flexible shaft assembly of the type including an outer casing with a plastic outer wall and arranged to carry a flexible shaft for transmitting movement between an element engaged with one end of said shaft for moving said shaft and second element engaged with the opposite end of said shaft for movement by said shaft, the improvement comprising a tubular plastic ferrule for one end of said casing with said ferrule including internal threads formed for fastening said ferrule to said plastic outer wall by deforming only the outer surface of said outer wall without either deforming the inner surface of said casing or cutting the outer surface of said outer wall.

2. The ferrule claimed in claim 1 in which said threads are tapered and each thread is truncated to avoid cutting.

3. The ferrule claimed in claim 1 in which said threads have a minor diameter between .347″ and .342″ adjacent one end of said ferruel and a minor diameter between .315″ and .320″ intermediate the ends of said ferrule with the major diameter defining the space between each thread having a substantially constant dimension.

4. For use with a flexible shaft assembly of the type including an outer casing with a plastic outer wall having a relatively smooth outer surface and arranged to carry a rotatable flexible shaft for transmitting movement between an element engaged with one end of said shaft for rotating said shaft and second element engaged with the opposite end of said shaft for rotation by said shaft with one element having a hollow externally threaded boss associated therewith for receiving a coupling nut having an opening and through which said shaft extends, the improvement comprising a tubular plastic ferrule for one end of said casing with said ferrule arranged to pass through said coupling nut opening and including integrally formed truncated internal threads having a constant major diameter for fastening the respective ferrule to said outer plastic wall by deforming only the outer surface of said outer wall in response to the threading of said ferrule on said outer wall, a peripheral flange integrally formed on one end of said ferrule for abutment with a respective boss in response to said coupling nut being threaded to the said boss, and an integrally formed stop on said ferrule extending radially inwardly of said ferrule for abutting the respective casing end to restrain longitudinal movement of the casing in one direction.

5. For use with a flexible shaft assembly of the type including an outer casing with a plastic outer wall having a relatively smooth surface and arranged to carry a rotatable flexible shaft for transmitting rotatable movement between an element engaged with one end of said shaft for rotating said shaft and second element engaged with the opposite end of said shaft for rotation by said shaft with one element having a hollow externally threaded boss for receiving a coupling nut having an opening through which said shaft extends, the improvement comprising a tubular plastic ferrule for one end of said casing with said ferrule passing through said coupling nut opening and including integrally formed internal threads having a taper of radially expanding diameter from adjacent one end of said ferrule to a position intermediate the ends of the respective ferrule for fastening the respective ferrule to said outer plastic wall by deforming the outer surface only of said outer wall without either deforming the inner surface of said casing or cutting the outer surface of said outer plastic wall, a peripheral flange integrally formed on one end of said ferrule for abutment with said boss in response to said coupling nut being threaded to the respective boss, and an integrally formed stop extending radially inwardly in each ferrule for abutting said one casing end to restrain longitudinal movement of the casing in a respective direction.

References Cited

UNITED STATES PATENTS

| | | | |
|---|---|---|---|
| 2,243,960 | 6/1941 | Hotchkiss | 64—4 |
| 2,525,922 | 10/1950 | Mandz | 64—4 |
| 2,580,818 | 1/1952 | Mundy et al. | 285—40 |
| 2,884,771 | 5/1959 | Holt | 64—4 |
| 3,190,084 | 6/1965 | Moon et al. | 64—3 |
| 3,242,691 | 3/1966 | Robinson et al. | 64—3 |

FOREIGN PATENTS

| | | |
|---|---|---|
| 539,214 | 4/1957 | Canada. |
| 1,034,729 | 4/1953 | France. |

HALL C. COE, *Primary Examiner.*